(12) United States Patent
Lovett et al.

(10) Patent No.: US 7,760,769 B1
(45) Date of Patent: Jul. 20, 2010

(54) SERIAL STREAM FILTERING

(75) Inventors: Stuart J. Lovett, Coraopolis, PA (US); Andrew G. Reynolds, Mars, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 831 days.

(21) Appl. No.: 11/280,475

(22) Filed: Nov. 15, 2005

(51) Int. Cl.
*H04J 3/02* (2006.01)

(52) U.S. Cl. ........................ 370/542; 370/535; 370/537; 717/124

(58) Field of Classification Search ......... 370/470–472, 370/535, 537, 542; 709/62, 217, 229, 223, 709/253; 702/117, 186; 717/124, 135; 714/38, 714/46
See application file for complete search history.

(56) References Cited

U.S. PATENT DOCUMENTS

| | | | | |
|---|---|---|---|---|
| 5,764,642 | A * | 6/1998 | Chambers et al. ........... 370/462 |
| 6,023,478 | A * | 2/2000 | Kilk et al. ................... 370/535 |
| 6,941,492 | B1 * | 9/2005 | Ezra et al. ...................... 714/38 |
| 6,952,659 | B2 * | 10/2005 | King et al. ................... 702/186 |
| 7,225,235 | B2 * | 5/2007 | Garnett et al. .............. 709/217 |
| 7,225,247 | B2 * | 5/2007 | Kennedy et al. ............ 709/223 |
| 2002/0091869 | A1 * | 7/2002 | Jones et al. .................. 709/310 |
| 2003/0233634 | A1 * | 12/2003 | Carrez et al. ................ 717/124 |
| 2004/0250244 | A1 * | 12/2004 | Albrecht ..................... 717/135 |

\* cited by examiner

*Primary Examiner*—Jayanti K Patel
*Assistant Examiner*—Matthew Campbell
(74) *Attorney, Agent, or Firm*—Blakely, Sokoloff, Taylor & Zafman LLP (57) ABSTRACT

Methods and apparatus provide for the combining and filtering of serial data from multiple serial data sources. At least one of the serial data sources frames serial data into packets. The serial data source that frames serial data drives a serial port in an exclusive manner. Another serial data source also provides data to the serial port. As the serial data comes from the sources, the serial port generates a stream of serial data that is sent to a serial stream filter. The serial stream filter extracts the packet from other serial data and selectively forwards the packet and the other serial data to one or more recipients.

17 Claims, 5 Drawing Sheets

SERIAL STREAM FILTERING

FIELD

Embodiments of the invention relate to serial communication, and more particularly, to multiplexing and demultiplexing serial streams, such as for purposes of testing a computer or other device.

BACKGROUND

Testing is an integral part of development and deployment of a system. When a system includes one or more components on a workstation, computer, or similar device, system testing may involve transmission of information from the workstation through a serial port to one or more target devices for testing/evaluation. For example, the deployment of system software (e.g., an operating system) could include testing the software while installed on a computing device, and transmitting information from the computing device to a serial console and/or to a remote debugger through a serial port. Platforms or machines with multiple serial ports were common at one point in time; however, platforms with only a single serial port available are becoming more common. If the testing procedures include more than one entity (e.g., a serial console, a remote debug session, a test fixture, a proprietary testing device) with data to communicate via a serial port, traditional approaches have required expensive and/or complex port duplicating hardware to enable system testing.

SUMMARY

A serial port sends a serial stream to a serial stream filter. The serial stream includes data from one or more sources, including one that formats serial stream data according to a protocol with framing. The serial stream filter processes the serial stream to extract the framed data, and forwards the extracted framed data to a first recipient, and data from the serial stream to another recipient.

Multiple serial data sources send data to a common serial port to transmit the serial data to a serial stream filter. Temporary exclusive control of the serial port is obtained for an application stub. The application stub sends framed data that is formatted according to a protocol including framing. The framed data is sent to a serial stream filter to separate the framed data from the serial stream and forward the framed data and other serial data to different recipients.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A system that is deployed on a computer, workstation, or other computing device is typically tested for compatibility, functionality, etc., prior to release. Such a system may be or include a program kernel for an operating environment (e.g., an operating system), an operating system itself, a functionality module, etc. To interface with the system for testing, a testing module, program, and/or console may be used. A software interface or application program interface (API) may be written to provide a mechanism for gathering information from, or passing information to the system being tested. The API is software that resides logically between higher and lower levels of software to provide a communication interface between the software. Specifically herein, an API refers to software that interfaces higher level software (e.g., a tested operating system, a debugging program) with a hardware driver (e.g., a serial communication port driver). A hardware driver refers to software that interacts with a circuit to control the use of the circuit. APIs to hardware drivers generally exist as system-level software of an operating system. When an operating system is being tested, the APIs may be part of the tested system, or external to the tested system to provide interfaces from the tested system to the hardware.

To process information received from the tested system, or to provide the input information, an external testing device can be connected to the tested system. In one embodiment the interface includes capabilities to communicate over a communication port, such as a serial port, on the tested system. When multiple test entities (e.g., a serial console, a remote debug session, a test fixture, a proprietary testing device) are to interface with a single tested system, the system may be enabled to communicate with the multiple testing entities over a single communication port, through multiplexing and/or demultiplexing of serial streams for the communication port.

Multiple test entities are configured to send data to or drive a common serial port. Driving a serial port refers to sending instructions to cause hardware components to implement voltage swings on the serial port that represent data. Data is sent or written by higher layer software (e.g., a serial port API) to a serial port driver (referring to the low-level hardware-interface software). The sending of data from the API to the driver generally causes the driver to issue instructions to the circuitry to send signals out the serial port to represent the data written to the driver. As used herein, "driving" a serial port refers to the writing of data to the driver software, which implicitly includes low-level interaction with the hardware components.

The serial port transmits the serial data of the multiple test entities together to a serial stream filter. The serial stream filter extracts the different serial streams from the different sources, and selectively forwards the serial streams to one or more intended recipients. The recipients are devices remote from the tested system, and are referred to herein as "remote devices." The details of the extracting of the serial streams are described below. Thus, multiple test entities can communicate with a tested system using a single serial port.

Figure 1:
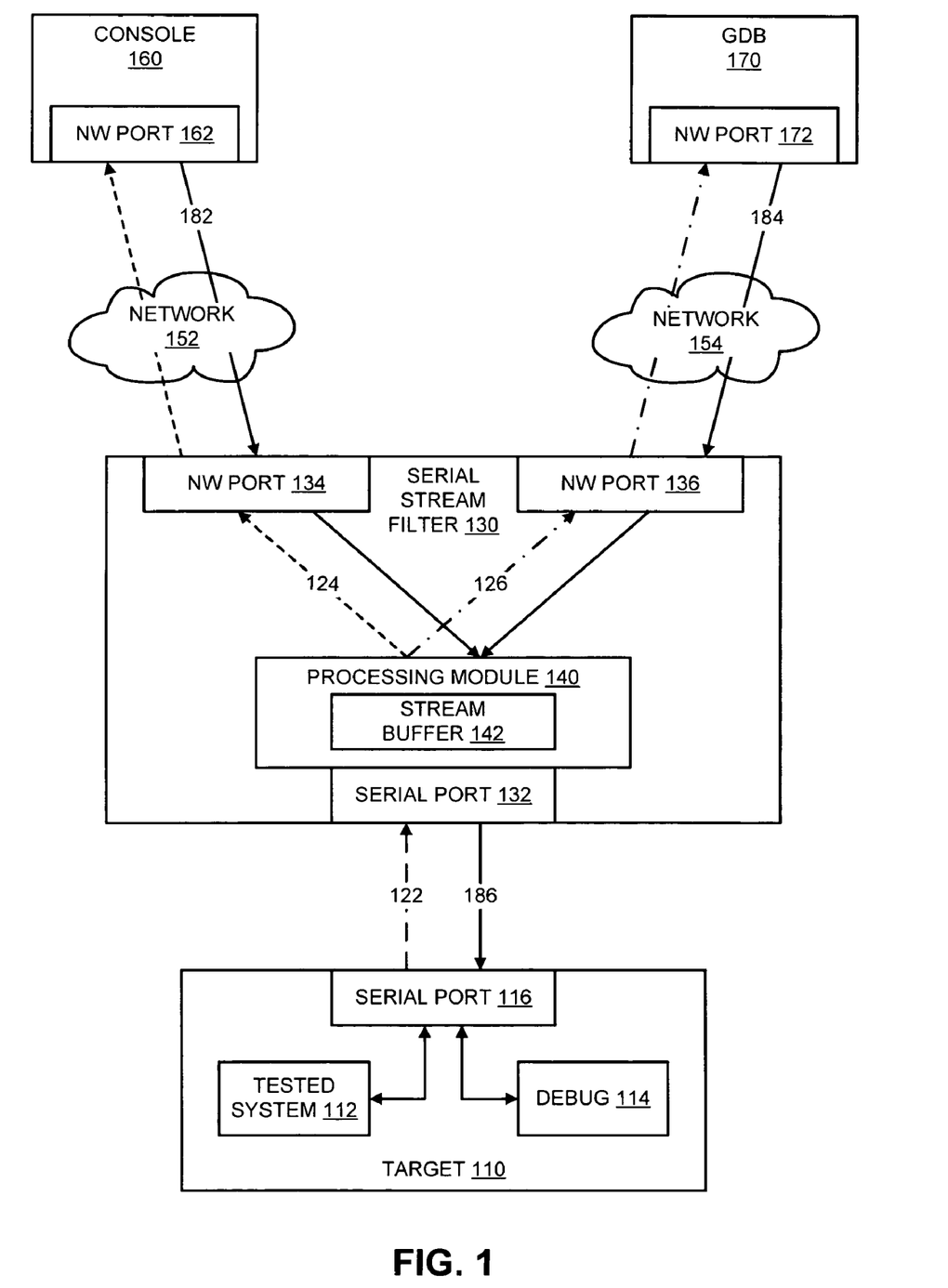
FIG. 1 is a block diagram of an embodiment of a serial stream filter coupled with a target through a serial connection.

FIG. 1 is a block diagram of an embodiment of a serial stream filter coupled with a target through a serial connection. Target 110 represents a device having a system to be tested, which is referred to herein as "tested system." Target 110 may be or include a workstation, a server-class computer, a personal computer, a laptop computer, a computing or processing appliance, etc. Target 110 includes tested system 112, which could be an operating system kernel, a software module, a software application, etc. In one embodiment tested system 112 is a DATA ONTAP® operating system kernel available from Network Appliance, Inc. of Sunnyvale, Calif. Tested system 112 generates information about its performance. The information can be sent out serial port 116 to external entities for display and/or diagnosis. Target 110 further includes debug 114, which is a stub for a remote debug program. A "stub" refers to a small program routine that substitutes for a larger program located remotely from the device on which the stub is found. The stub can communicate with the main program by using, for example, Remote Procedure Calls (RPCs). Debug 114 generates information to be sent out serial port 116. Target 110 further includes serial port 116, which allows target 110 to interface with external devices. Tested system 112 may generate information to transmit to a console, for example, a Telnet session on an external device. Tested system 112 may also be monitored by debug 114, which communicates over serial port 116. GDB 170 represents one embodiment of a remote debugging system that might communicate with tested system 112.

The console information generated by tested system 112 can be viewed as a first serial stream sent to serial port 116. The debugging information generated by debug 114 can be considered a second serial stream sent to port 116. The generation and transmission software for the console information and the API for tested system 112 to communicate to GDB 170 are performed in a manner to combine the streams without interrupting a GDB packet. Thus, the combined stream can include a GDB packet and other serial data to transmit out serial port 116, as shown by combined stream 122. In one embodiment the tested system includes software to communicate directly with a driver of serial port 116. In one embodiment both tested system 112 and debug 114 use a common serial port API to interface with a driver of serial port 116 and drive serial port 116 with data. In one embodiment tested system 112 and debug 114 include separate APIs to interface a driver of serial port 116. The APIs can exist as a system component if the API is common, or may be written for a particular software program and loaded and executed in conjunction with the particular software program.

Thus, multiple modules of interface software can be made to utilize the same communication port for communication. For example, software for a general computing device may have reference to one or more serial ports, typically referred to as "com 1" and "com 2." Instead of having two different test entities interface via different serial ports, tested system 112 and debug 114 refer to common serial port 116. One or more bits of information sent by each entity to a communication port are referred to herein as a stream. Thus, with multiple testing entities, multiple streams can be generated and sent to serial port 116. Serial port 116 may be controlled via simply writing data to the port, or via securing exclusive control with semaphores, polling (e.g., a serial communication API querying the data sources), handles, or other code locks, for transmission of internal data. Serial port 116 forwards information written to it by tested system 112 and debug 114. Thus, multiple test entities can place multiple streams into a single combined stream on the serial port. A combined stream or multiplexed serial stream as referred to herein refers to the concept that multiple serial data sources use the same serial port, or same signal line, to transmit serial data. A stream with data bits from only a single source is still a combined stream for purposes herein if another source is configured to use the same serial port.

The streams can be information of different types, and specifically can be formatted according to different protocols, for example, RS-232, GDB. A protocol refers to one or more rules and/or suggestions that define or provide a manner to generate and/or understand a communication stream. A protocol is typically established with reference to bit patterns, a field of data, timing (e.g., when bits can be sent, how long a rise or fall time can be, how long a high logic level must be present to trigger a "one" bit, etc.), bit format, a header or other standard information bit/byte, and/or some combination of these and/or other types of formatting of a communication stream. While some protocols for serial port data allow for the transmission of information byte-by-byte (e.g., RS-232), some protocols include framing (e.g., GDB). "Framing" refers to a concept of segmenting or sectioning off data with one or more fields. For example, data may be framed by having a start of frame/packet indicator and an end of frame/packet indicator. The indicators may include a particular byte or other bit pattern, a timing sequence, or other stream and/or field delimiter. A "field" refers to a grouping or set of one or more bits that represent a value, a command, an instruction, data, etc. As used herein, "framing" refers to the segmenting of a stream according to a protocol, a packet start and a packet end refer to stream segment delimiters, and a "packet" or "frame" refers to a delimited stream segment. The use of the terminology set forth is solely for purposes of consistency of description, and other terminology could be used to describe the concepts presented herein.

One serial protocol with framing is the debugging tool available from GNU (GNU's Not Unix) of the Free Software Foundation of Boston, Mass., known as GDB (GNU DeBugger). GDB allows for remote console control of a system. A serial stream protocol such as GDB may ignore any serial traffic that has a different format. Thus, if a device running GDB receives a console message that has no packet format, or has a different format, the traffic will be ignored by GDB. Description with reference to GDB herein should be understood as being potentially applicable to another serial protocol with framing.

To allow the correct transmission of packet traffic through serial port 116, an API that will transmit traffic for debug 114 is configured to drive serial port 116 to prevent a console from inserting or removing characters when a GDB message is being transmitted on the port. For example, if the API drives the serial port in a polled mode, whole GDB packets can be sent and received without interruption. By obtaining exclusivity over the serial port for the period of the sending of a packet, a GDB stub can prevent interruption of the packet by serial data from another serial data source (e.g., the tested system). As used herein, exclusivity of the serial port refers to a state where only a single entity has control over the serial port. Thus, when one entity has exclusive control of the serial port, another entity is prevented from writing data to the serial port until the exclusive period ends, and the exclusivity is released. The GDB stub specifically refers to a stub associated with a remote GDB debugging session. The GDB serial port read and write APIs point to a common port with another serial communication entity, and drive the port with temporary, local exclusivity.

Combined stream 122 is received at serial port 132 of serial stream filter 130, and forwarded/passed to processing module 140. Processing module 140 represents hardware and/or software that monitors or processes serial stream 122 on serial traffic from target 110. Processing module 140 includes one or more processing rules or mechanisms for detecting GDB packets and separating the packets from the remainder of the data. In one embodiment multiple packet-based serial streams may be present in combined stream 122, and each packet could be individually detected and separated from the serial stream. Serial stream filter 130 may be a standalone device, or be part of a serial concentrator or other serial connection device. In one embodiment target 110 includes a serial concentrator circuit of which serial stream filter 130 may be a part.

To direct serial streams to their proper target from a tested system, or to direct serial streams from targets to the tested system, serial stream filter 130 multiplexes and demultiplexes serial streams. For purposes of description, serial stream filter refers herein to a serial stream device or module to perform the functions described herein for combining and/or splitting serial streams. As described below, serial stream filter 130 may also combine serial information from console 160 or GDB 170 (remote devices with respect to target 110) to send to the tested system. Serial stream filter 130 provides an interface with a serial port to receive combined serial streams to be demultiplexed. The serial stream filter also provides two or more interfaces to connect to remote devices to receive the serial streams. The serial stream filter provides filtering, processing, or other functioning on the serial streams between the tested system and the multiple remote devices to exchange the serial traffic between the tested system (the target) and the remote devices. Serial stream filter 130 may include a command line interface and/or a graphical interface, which may provide status, and allow a user (e.g., a system administrator, an engineer, a technician) to enable and/or disable various levels of diagnostic messages. In one embodiment the serial stream filter 130 includes software running under the LINUX operating system on a device having a serial connection to the tested system, and multiple network ports open on a network connection over which to connect to the remote devices. The connection to the tested system may be through a serial port or through a serial concentrator (e.g., a CYCLADES box of Cyclades Corporation of Fremont, Calif.), which may also be referred to as a serial port aggregator or a console server.

In one embodiment processing module 140 includes stream buffer 142, which includes hardware and logic to buffer or cache combined stream 122, in whole or in part. In one embodiment stream buffer 142 puts all data from combined stream 122 into a buffer, and determines if the stream includes a packet. In another embodiment stream buffer 142 monitors combined stream 122 and passes the stream along unless a packet-start indicator is received. The packet start indicator may be a byte or other string of bits or other stream delimiter. In response to detecting the packet start, stream buffer 142 could then buffer bits that are received after the packet start until a condition occurs.

The condition could be that a certain number of bits (a threshold) are received, a time period has lapsed (a timeout), or a packet end indicator is received. One mechanism to determine a number of bits received is for stream buffer 142 or another entity of processing module 140 to count the bits received and trigger an action upon the reaching of the number. Another mechanism to determine the number of bits received is for stream buffer to have a buffer with a size equal to a threshold number of bits desired, and the buffer overflow will be an indicator of the number of bits. For the timeout, a timer can be started when a packet start indicator is received and the timer can be polled or interrupt-driven to signal the timeout. When a packet end indicator is received, the number of bits of the packet can be checked to determine if the packet is valid. Alternatively, a checksum can be verified to determine the validity of the packet.

Processing module 140 can separate combined stream 122 to different streams for the different intended recipients. Processing module 140 is shown having two outgoing streams, 124 and 126, which each represent all or part of combined stream 122. In one embodiment GDB 170 discards all received information not formatted according to its protocol framing. Thus, processing module 140 may forward stream 126 as a complete copy of stream 122 to GDB 170, which discards any information intended for console 160. In another embodiment only packets of information are forwarded to GDB 170 and console bits of the stream are not sent. In one embodiment stream 124 represents only data bits that are not formatted according to the protocol framing of GDB 170.

In a specific GDB implementation with a Telnet console, operation may proceed as follows. The serial stream filter may monitor the serial stream for certain predetermined characters, such as '$' and '#', used by the GDB protocol to denote, respectively, the start of a packet and the end of the packet. If the serial stream filter receives a '$' character from the tested system, it may cache the combined serial stream for a certain period of time (e.g., 1 second), for a number of characters (e.g., a maximum number of characters for a packet according to the GDB protocol), or until a '#' is received. In one embodiment the serial stream filter includes a character buffer of a certain length and continuously buffers received data. The number of characters for timeout may thus be a threshold number in the buffer, or a number after which overflow will occur. If the serial stream times out by allowing a certain amount of time or a certain number of characters pass without a packet end character, the filter can forward all the cached characters to the console. If a '#' character is received, the serial stream filter will have a suspected packet, and can perform a checksum or other check mechanism on the suspected packet. If the check mechanism verifies, the serial stream filter considers the packet to be valid and passes it to the GDB. If the check mechanism fails, the serial stream filter can consider the suspected packet to not be a packet, and forward the characters on to the Telnet console.

Serial stream filter 130 includes network (nw) ports 134 and 136 to transmit over networks 152 and 154, respectively to the recipient devices. Network ports 134 and 136 may reside on the same hardware and refer to different logical channels. Networks 152 and 154 may both refer to the same network, or may refer to separate networks. Serial stream 124 is forwarded over network 152 to network port 162 of console 160. Serial stream 126 is forwarded over network 154 to network port 172 of GDB 170.

In one embodiment the remote devices (console 160 and GDB 170) generate serial data (streams) to transmit back to tested system 112. The remote devices send data to serial stream filter 130, which multiplexes the data streams. Multiplexing the streams from the remote devices includes receiving streams from the multiple remote devices and combining the streams into a single stream that will be delivered to the tested system. Within the tested system, the serial communication APIs can parse and interpret the messages sent from the remote devices.

Specifically with reference to FIG. 1, data that originates from console 160 and from GDB 170 is forwarded to serial stream filter 130 for combination or multiplexing to pass to target 110. Stream 182 from console 160 is passed to network port 134 of serial stream filter 130. Stream 184 from GDB 170 is passed to network port 136 of serial stream filter 130. Streams 182 and 184 are combined to stream 186 for passing to target 110. The combination or multiplexing of streams 182 and 184 into stream 186 can be performed similarly to how the combination stream 122 is generated at target 110 by multiplexing the data onto a common serial port. Similar to what is described above, serial stream filter 130 can drive serial port 132 in a polled manner to multiplex the streams and retain the integrity of packetized data.

Figure 2:
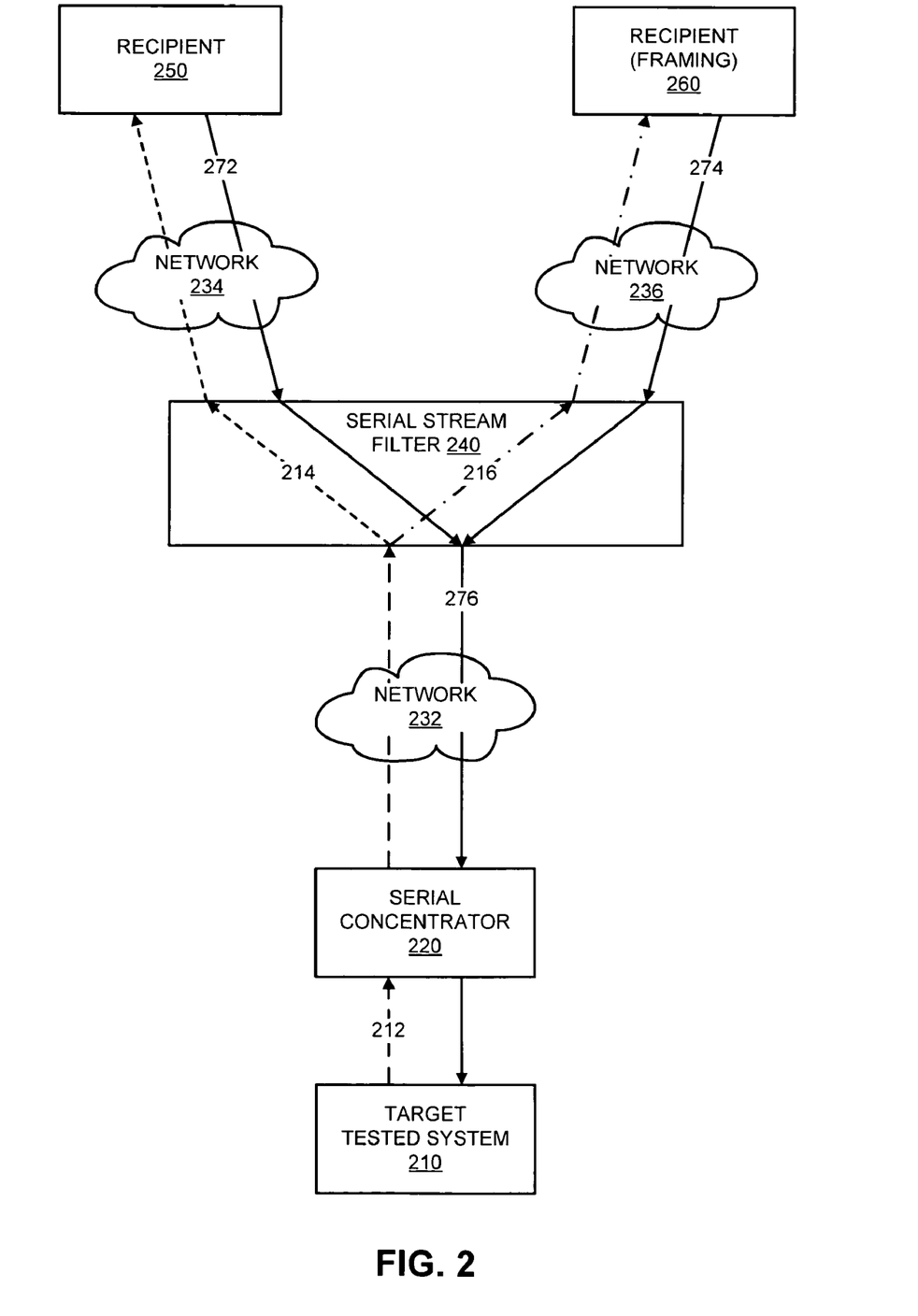
FIG. 2 is a block diagram of an embodiment of a serial stream filter coupled with a target through a network connection.

FIG. 2 is a block diagram of an embodiment of a serial stream filter coupled with a target through a network connection. In one embodiment the elements of FIG. 2 are the same as the elements of FIG. 1 above, with the addition of serial concentrator 220. However, the elements of FIG. 2 are not necessarily limited to the embodiments described above with respect to FIG. 1. Target tested system 210 represents a target of serial communication activity, which refers to the concept that serial communication is generated from target tested system 210 for evaluation and/or that serial communication is generated to be sent to target tested system 210 to cause or result in an action occurring at target tested system 210.

Target tested system 210 generates combined serial stream 212 from a data generator in the tested system that produces/responds to bits or bytes of information and a data generator that produces/responds to packets of information. Thus, combined serial stream 212 at some point includes data formatted according to a protocol with framing.

Serial concentrator 220 refers to a device that has multiple serial ports that can be accessed by multiple devices over a network. Network 232 interfaces serial concentrator 220 with other devices, and may couple with serial stream filter 240 over network 232. In one embodiment, in place of serial concentrator 220, a serial-to-BMC connection or interface is employed. The BMC can place serial traffic on a network, thus multiplying the possible connections to which the serial port may be applied. In one embodiment serial stream filter 240 exists on the BMC circuit.

Although not shown in detail in FIG. 2, serial stream filter 240 includes one or more modules (described below) to provide processing of combined serial stream 212. Combined serial stream 212 can be demultiplexed into serial streams 214 and 216, which provides for separation of data according to a framing protocol. In an implementation where a serial concentrator is used, serial stream filter 240 may operate to filter multiple combined streams from multiple target tested systems. In such an implementation, serial stream filter 240 can buffer each serial port separately to avoid inadvertent overlap of streams. In one embodiment one or more serial stream filters 240 are incorporated onto a serial concentrator device 220.

In an implementation where a serial concentrator is used, the serial stream filter can connect to the serial concentrator over a network, for example an Internet Protocol (IP) network. Rather than addressing the address of the serial port on the target tested system, the serial stream filter can address the port on the concentrator. Thus, the serial stream filter can access the tested system by tunneling the connection to the tested system through the serial concentrator. The serial concentrator forwards the data stream from the serial stream filter to the tested system's serial port and from the tested system's serial port to the serial stream filter.

In one embodiment the serial stream filter can be connected to the serial port of the tested system via a BMC connector (Baseboard Management Controller). A BMC is a chip or integrated circuit on a motherboard of a computing device that monitors environmental sensors and drives hardware equipment in response to the monitoring of the sensors. For example, a BMC may monitor a temperature within a computing device and control a fan in response to temperature changes. The BMC generally include a processor and an Ethernet interface to enable an administrator to connect to it and check the status of the environmental readings. The BMC also includes a hard wired interface to the host serial port. Because of the network (Ethernet) and serial port interfaces, the BMC could be used as a serial concentrator by exchanging serial traffic with the BMC over the Ethernet port interface via the SOL (serial over LAN (local area network)) protocol, which is exchanged between the BMC and the serial port. Thus, to transmit a serial stream from the tested system may include sending the message through the BMC to one or more intended remote devices on the network. In reverse, a remote device can transmit a serial message via SOL to the BMC to be converted and sent to the serial port.

Serial stream filter 240 forwards stream 214 through network 234 to recipient 250, and stream 216 through network 236 to recipient 260. Recipient 260 is shown as a recipient that utilizes a protocol that includes framing. Recipients 250 and 260 may also generate streams 272 and 274, respectively, which is received and combined at serial stream filter 240 into stream 276. Stream 276 is then passed through serial concentrator 220 to target tested system 210. Within target tested system 210, the combined stream can be filtered in a similar manner as within serial stream filter 240.

Figure 3:
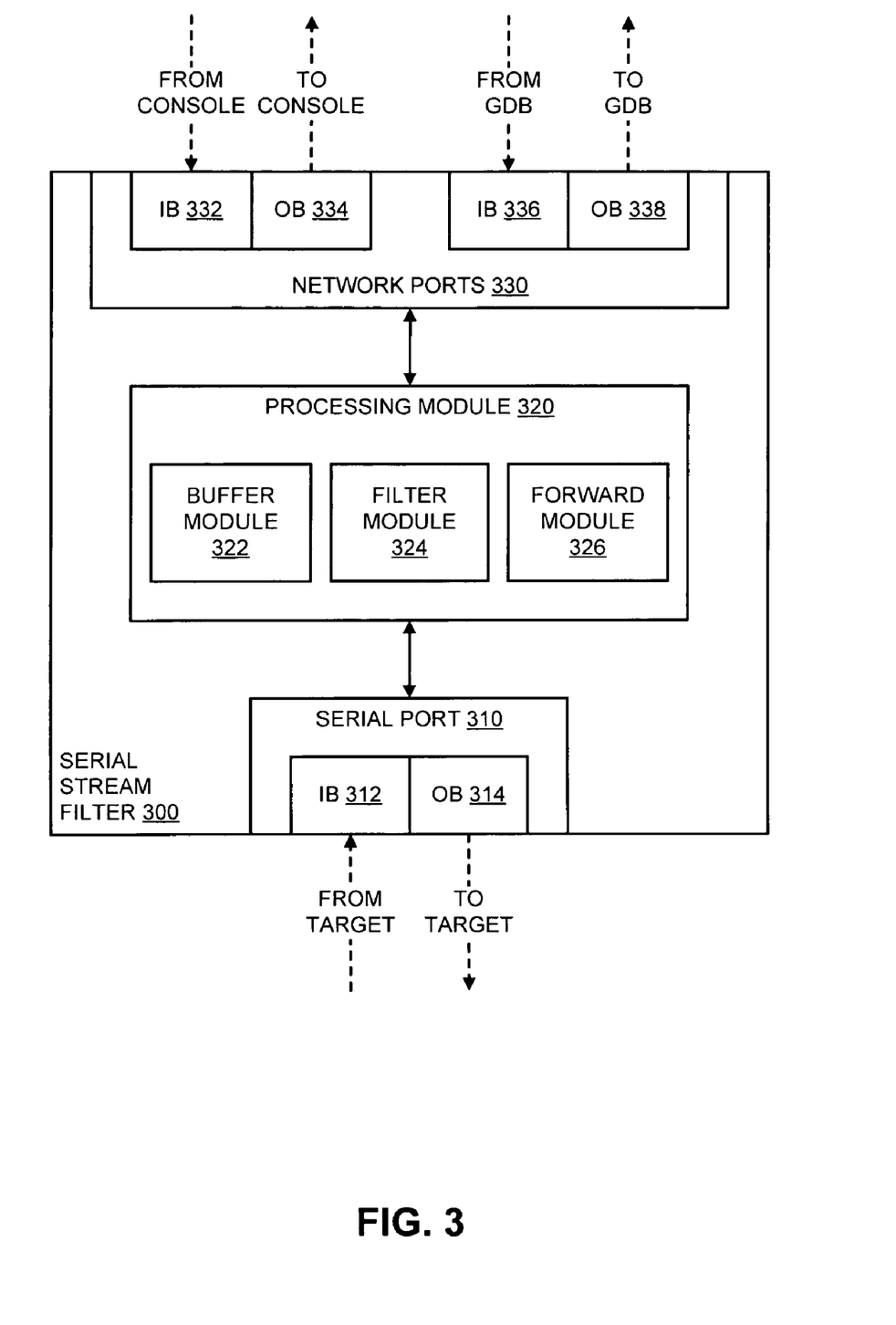
FIG. 3 is a block diagram of an embodiment of a serial stream filter.

FIG. 3 is a block diagram of an embodiment of a serial stream filter. Serial stream filter 300 is an example of a serial stream filter according to any embodiment of a serial stream filter previously described. Serial stream filter 300 provides multiplexing of serial streams from multiple entities to a target system. Serial stream filter 300 also provides demultiplexing of a combined serial stream from the target system to multiple recipients.

Serial stream filter 300 includes serial port 310, which represents hardware to provide a serial connection, as well as controlling software to drive the hardware. Serial port 310 has a physical connector that provides for input and output. Input and output can be driven by different pins of the physical connector. The driving of the different connections may also be controlled by different routines or function calls. Thus, inbound (IB) connection 312 represents the receive path, including the driving software, of serial port 310. On inbound connection 312, serial stream filter 300 receives a combined serial stream from the target. Outbound (OB) connection 314 similarly represents the transmit path, on which serial stream filter 300 sends a combined serial stream to the target. In one embodiment serial stream filter 300 does not generate a combined serial stream to send to the target. Instead, serial stream filter 300 buffers data destined for the target, and selectively sends the data out outbound connection 314 according to a schedule. For example, the target may include a module that enables serial stream filter 300 to establish a connection with a particular entity within the target (e.g., the tested system itself, a debugger) that transmits and receives on the common serial port. Once a connection is established, serial stream filter 300 transmits data to that entity, either until the data is all sent, or a schedule indicates that serial stream filter 300 should send data to the other entity.

Serial port 310 is coupled with processing module 320, which includes one or more elements to provide processing of serial streams. Processing module 320 may include buffer module 322, filter module 324, and forward module 326. These modules are not intended to represent an exclusive, nor an exhaustive list of modules that can be present in processing module 320; more or fewer modules can exist in processing module 320. Buffer module 322 provides buffering of serial streams. This may occur on traffic streams incoming from the target, or outgoing to it. In one embodiment separate transmit and receive buffers are used. On incoming traffic, buffer module 322 may buffer the stream by default, if an indication is received from filter module 324, or if a packet start is detected. On outgoing traffic, buffer module 322 enables processing module 320 to buffer incoming traffic to be multiplexed and transmitted to the target, including potentially scheduling the sending of traffic from the stream to different entities within the target. In one embodiment buffer module 322 includes a separate buffer for each entity within the target. Modules 322, 324, and 326 may be implemented in the form of software executed by one or more programmable processors, or by special-purpose hardwired circuitry, or a combination thereof.

Buffer module 322 may include dedicated memory (e.g., any variety of random access memory (RAM), Flash, etc.), or may use system memory to temporarily store incoming traffic prior to forwarding the incoming traffic. Buffer module 322 includes control software to interface with the I/O ports of serial stream filter 300 to temporarily hold received data internally to serial stream filter 300 prior to sending it out an output port.

Filter module 324 enables processing module 320 to distinguish one serial stream from another in a combined serial stream, and separate the serial streams. Separating the serial streams may also be referred to as extracting and/or splitting the streams. Filter module 324 can monitor the serial streams for certain characters or patterns that represent a packet end or start. In one embodiment filter module 324 signals buffer module 322 when a packet delimiter (start or end) is detected. Signaling the end of a packet can enable buffer module 322 to stop buffering traffic. Filter module 324 can monitor the serial stream by using a comparator (either hardware or software) to determine when a certain character or bit combination is received that indicates a packet of a particular stream. When the packet indicator is detected, filter module 324 may cause an output port to stop sending information to one or more remote devices and/or activate one or more different outputs to other remote devices. The serial stream may be buffered to allow the filter module to watch for an end of packet indicator prior to determining to send the serial data to one or more remote devices.

Forward module 326 enables processing module 320 to send traffic to its proper destination. Thus, for demultiplexing a combined serial stream from the target, forward module 326 sends traffic to network ports 330 according to the destination of the separated streams. In one embodiment filter module 324 separates packets from an incoming serial stream, and forward module 326 transmits only the packet to the GDB. In another embodiment the entire serial stream is forwarded to the GDB, but the serial stream without the packets is forwarded to the console.

Network ports 330 represent network interface ports on one or more network interface cards/circuits/devices. Each network port can be considered to have a separate inbound (IB) and outbound (OB) line. Thus, network ports 330 can include inbound line 332 from and outbound line 334 to a console, inbound line 336 from and outbound line 338 to a GDB, etc. While only two ports are shown and only two external devices are referenced, serial stream filter 300 could include more ports and/or be coupled to more devices.

Components or elements of serial stream filter 300 are referred to as modules. A module may include hardware, software, and/or a combination of these. In a case where a module includes software, the software data, instructions, and/or configuration may be provided via an article of manufacture by a machine/computing device/hardware. An article of manufacture may include a machine accessible/readable medium having content to provide instructions, data, etc. The content may result in a computing device, as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing device having code loaded on a storage that may be executed when the computing device is in operation. Thus, delivering a computing device with such code may be understood as providing the article of manufacture with such content described above. Furthermore, storing code on a database or other memory location and offering the code for download over a communication medium via a propagated signal may be understood as providing the article of manufacture with such content described above.

Figure 4:
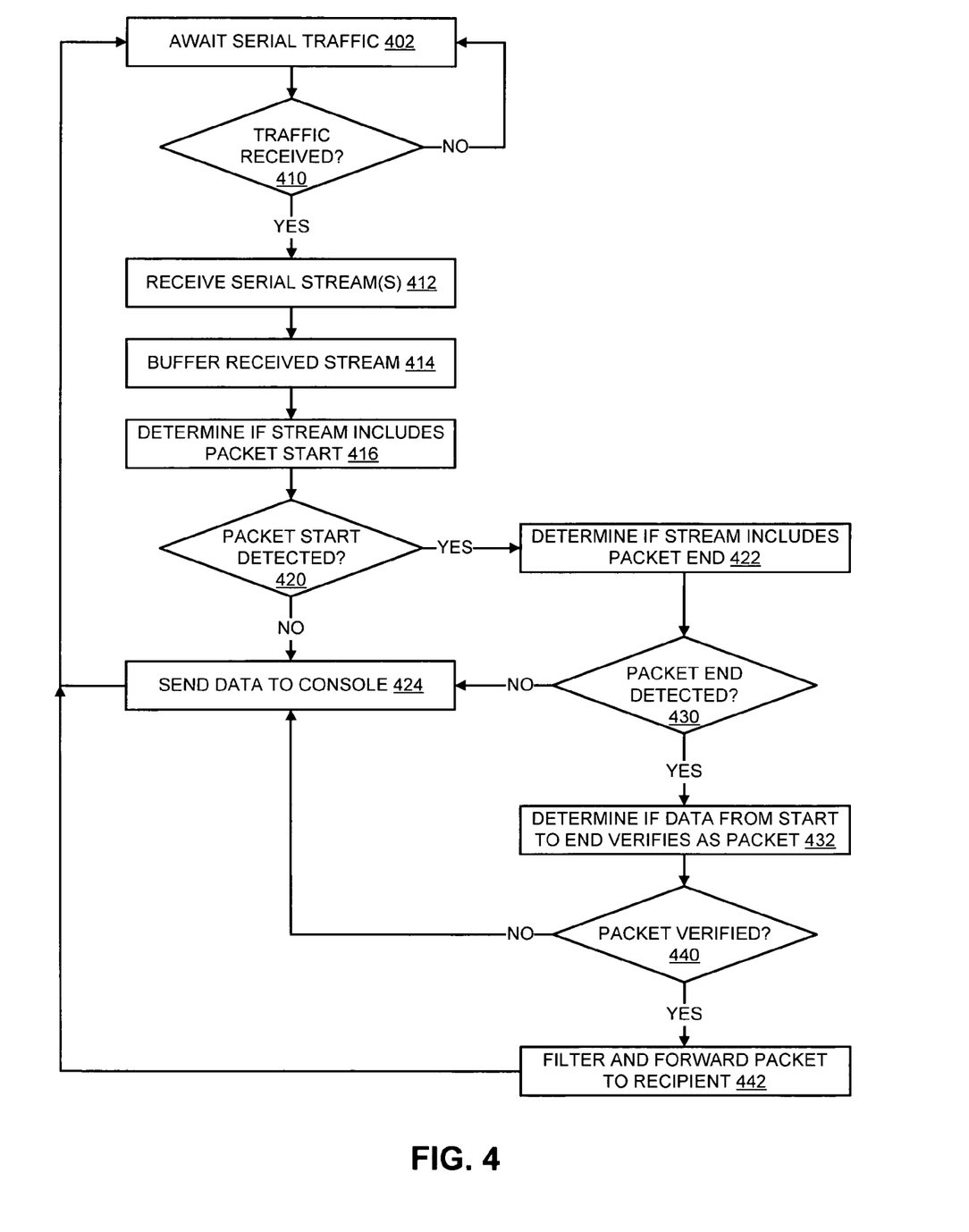
FIG. 4 is a flow diagram of an embodiment of a process of a serial stream filter receiving and forwarding serial traffic.

FIG. 4 is a flow diagram of a process performed by a serial stream filter to receive and forward serial traffic, in accordance with embodiments of the invention. The serial stream filter initially awaits serial traffic, 402. The serial traffic in this instance refers to serial traffic from a target device having a tested system. If serial traffic is not received, 410, the serial stream filter continues to wait. If traffic is received, the serial stream filter receives the one or more streams, 412, for processing. The received stream will be filtered to determine if multiple streams are included in the incoming stream. The incoming stream can be considered to be a "combined" stream if it could potentially receive traffic from multiple serial sources, regardless of whether at any given point there is traffic from multiple sources in received traffic. Thus, reference to a combined signal is not limiting, but describes the fact that the stream represents the output of one or more of multiple serial sources, where all serial sources use a common serial interface.

In one embodiment the serial stream filter buffers the received stream, 414. The buffering and the function of the buffering are described above. The serial stream buffer determines if the received stream includes a packet start, 416. In an embodiment where the serial stream is buffered, the serial stream filter may monitor the serial stream for the packet start prior to buffering, as well as processing the buffered data to detect a packet start.

If a packet start is not detected, 420, the serial stream filter can send all data to a console, 424, or other default serial communication receiver. If a packet start is detected, 420, the serial stream filter can process the serial stream looking for a packet end, 422. In one embodiment the packet start detection triggers the buffering of the received stream. Thus, the timing of particular operations is merely representative of one embodiment, and variations are possible. The determination of whether a packet end is received may end unsuccessfully after a certain amount of time, after a certain number of bits are buffered, after checking a certain number of bits in the buffer, etc.

If a packet end is not detected, 430, the serial stream filter may assume that a packet has not been received, and sends the data to the console, 424. If a packet end is received, 430, the serial stream filter determines if the data of the apparent packet (i.e., from the packet start to the packet end indicators) verifies as a valid packet, 432. A valid packet may be recognized by a certain number of bits, a particular pattern within the stream, or a valid checksum. If the packet does not verify as valid, 440, the data can be sent to the console, 424, and the serial stream filter will await more traffic. If the packet verifies, 440, the serial stream filter filters and forwards the traffic stream according to the recipients, 442, and awaits more traffic.

Figure 5:
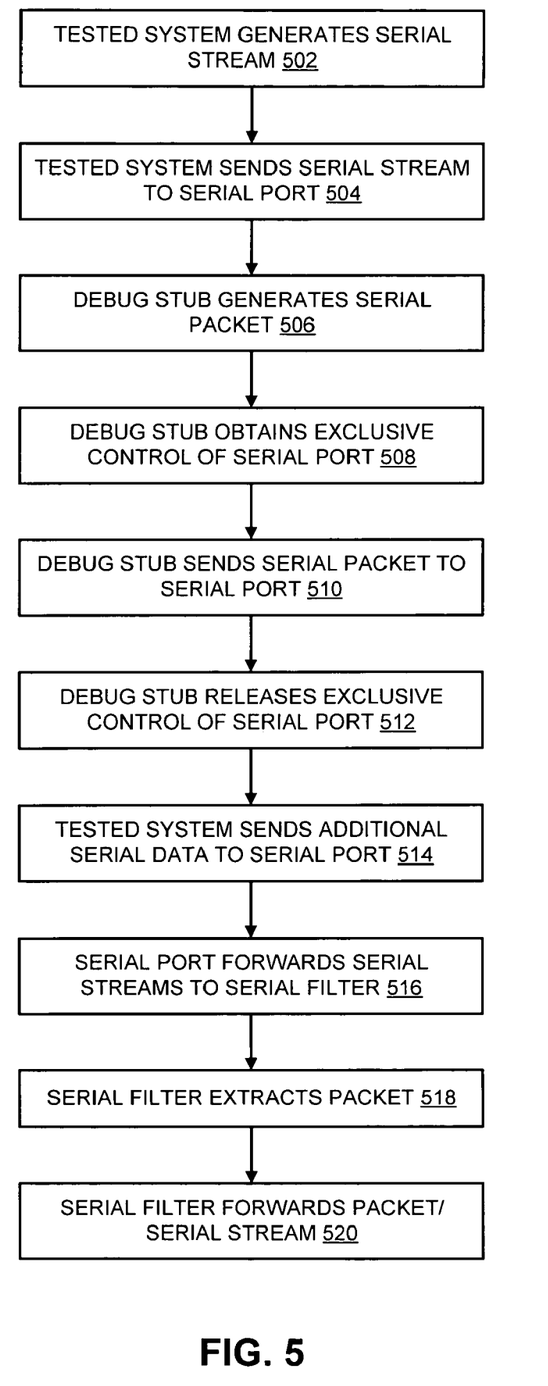
FIG. 5 is a flow diagram of an embodiment of a process of combining serial streams from multiple serial stream sources.

FIG. 5 is a flow diagram of a process performed by a serial stream filter to combine serial streams from multiple serial stream sources, in accordance with embodiments of the invention. A tested system generates a serial stream, 502. Generating a serial stream refers to the fact that the tested system generates one or more bits of data to transmit via a serial port. The tested system sends the generated serial stream to the serial port, 504. The tested system includes function calls to a serial communication API that specifies the serial port to be used. The specifying of the serial port to be used can be considered to configure the tested system to send serial data to the serial port. A debugger can also be configured to use the serial port for serial communication traffic.

A debugger may exist on a device remote from the system to be tested, and interface with a stub included locally on the system to be tested. The debug stub can be configured to use the serial port to exchange information with the remote debugger. The debug stub generates a serial stream packet to transmit to the remote debugger, 506. The debug stub may obtain exclusive control of the serial port to prevent interruption of the transmission of the packet to the serial port, 508. While the debug stub has control of the serial port, the debug stub sends the serial packet to the serial port for transmission, 510. After sending the packet, the debug stub releases exclusive control of the serial port, 512, which allows the tested system to again send serial data bits to the serial port.

The tested system may thus send additional serial data bits to the serial port, 514. All packets and other data received by the serial port are transmitted out the serial port to the serial stream filter, 516. The data incoming from the serial port to the serial stream filter may be of packet-type, or of non-packet type. The serial stream filter extracts the serial packet, 518, and forwards the serial packet and the serial stream to their respective recipients, 520.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
receiving a multiplexed serial data stream from a single physical serial port of a computing device, the multiplexed serial data stream having multiple serial data streams combined together from multiple serial data sources of the computing device that send serial data to the serial data port, at least one of the serial data streams to be a framed data stream formatted in accordance with a protocol having framing, and at least one of the serial data stream to be a non-framed data stream not having a structured data stream;
filtering the multiplexed serial data stream to extract the framed data stream from the multiplexed serial data stream to generate the framed data stream;
transmitting the extracted framed data stream to a session on a remote computing device; and
forwarding the non-framed data stream from the multiplexed serial data stream to a serial console.

2. The method of claim 1, wherein the protocol having framing comprises a protocol compliant with the GNU (GNU's Not Unix) DeBugger (GDB) protocol.

3. The method of claim 1, wherein filtering the multiplexed serial data stream comprises:
monitoring the multiplexed serial data stream to detect a frame start.

4. The method of claim 3, wherein filtering the multiplexed serial data stream further comprises:
monitoring the multiplexed serial data stream to detect at least one of an end-of-frame indicator, a timeout, or a threshold number of bits.

5. The method of claim 1, wherein filtering the multiplexed serial data stream to extract the framed data stream comprises:
storing data bits associated with the framed data stream to a memory.

6. The method of claim 5, wherein storing the data bits is performed in response to detecting a start-of-frame indicator.

7. The method of claim 1, wherein the serial console comprises a Telnet session on the computing device.

8. The method of claim 1, wherein the session on the remote computing device comprises a GDB session on the remote computing device.

9. The method of claim 1, wherein forwarding the data to the serial console comprises:
forwarding a stream to the serial console that includes all data of the multiplexed serial data stream, except the extracted framed data stream.

10. The method of claim 1, wherein forwarding the data to the serial console comprises:
forwarding the multiplexed serial data stream having the multiple serial data streams combined including the framed data stream.

11. An article of manufacture comprising a computer readable storage medium having instructions stored thereon, which when accessed cause a processor to perform operations including:
receiving data from a single physical serial port of a computing device, the physical serial port to send data for multiple serial data sources, at least one serial data source to generate packets formatted according to a serial protocol including framing, and at least one serial data source to generate a non-framed data stream;
filtering the received data to detect a packet;
extracting the framed data stream from the received data based on detecting the packet; and
forwarding the received data including the non-framed data stream to a serial console, and forwarding the framed data stream to a session on a remote computing device.

12. The article of manufacture of claim 11, wherein the session on the remote computing device comprises a remote debugging session.

13. The article of manufacture of claim 11, the instructions for filtering the received data further comprising instructions for monitoring the received data for a packet delimiter.

14. The article of manufacture of claim 11, the instructions for filtering the received data further comprising instructions for buffering the received data.

15. An apparatus comprising:
a serial port to receive serial data from a physical serial port of a target computing device, the serial data having multiple sources in the target computing device, at least one of the sources to format the serial data in a packet according to a serial protocol with framing, and at least one of the sources to generate a non-framed data stream;
multiple network ports coupled to multiple recipients, including a serial console session, and a session on a remote computing device as the intended recipient of the packet; and
a processing module coupled to the serial port and the network ports to extract the packet from the received serial data and selectively forward the serial data to the multiple recipients through the network ports, including forwarding the packet to the session on the remote computing device, and forwarding non-framed data to the serial console.

16. The apparatus of claim 15, wherein the session on the remote computing device comprises a remote debugger session, the remote debugger session being the intended recipient.

17. The apparatus of claim 15, further comprising:
a buffer module coupled to the serial port and the processing module to store the serial data for processing by the processing module.

* * * * *